(12) United States Patent
Eggebraaten et al.

(10) Patent No.: US 7,146,635 B2
(45) Date of Patent: Dec. 5, 2006

(54) APPARATUS AND METHOD FOR USING A DIRECTORY SERVICE FOR AUTHENTICATION AND AUTHORIZATION TO ACCESS RESOURCES OUTSIDE OF THE DIRECTORY SERVICE

(75) Inventors: Thomas John Eggebraaten, Rochester, MN (US); Patrick Jerome Fleming, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 09/749,159

(22) Filed: Dec. 27, 2000

(65) Prior Publication Data

US 2002/0083340 A1     Jun. 27, 2002

(51) Int. Cl.
*H04L 9/00* (2006.01)
(52) U.S. Cl. .......................................... 726/4
(58) Field of Classification Search ................ 380/229, 380/232; 705/67, 51, 54, 55, 1, 2; 707/9, 707/10; 709/203, 229, 224; 713/201; 726/2, 726/3, 4
See application file for complete search history.

(56) References Cited

U.S. PATENT DOCUMENTS 5,935,210 A * 8/1999 Stark ........................... 709/224
6,463,470 B1 * 10/2002 Mohaban et al. .......... 709/223
6,466,984 B1 * 10/2002 Naveh et al. ............... 709/228

OTHER PUBLICATIONS

Heinz Johner, Larry Brown, Franz-Stephan Hinner, Wolfgang Reis, Johan Westman, Understanding LDAP, Jun. 1998, IBM, International Technical Support Organization.*

Pending U.S. Appl. No. 08/968,100 "Method for Securing Sensitive Data in a Directory Service", filed Nov. 12, 1997.
Pending U.S. Appl. No. 09/455,702 "Method and System for Managing Multiple Lightweight Directory Access Protocol Directory Servers", filed Dec. 7, 1999.
Pending U.S. Appl. No. 09/460,849 "Method and System for Usage of Non-Local Data Within a Lightweight Directory Access Protocol Directory Environment", filed Dec. 14, 1999.

* cited by examiner

*Primary Examiner*—Jacques H. Louis-Jacques
*Assistant Examiner*—Thomas Ho
(74) *Attorney, Agent, or Firm*—Martin & Associates; Derek P. Martin (57) ABSTRACT

An apparatus and method use the built-in authentication and authorization functions of a directory service to perform authentication and authorization for resources that are external to the directory service. A Lightweight Directory Access Protocol (LDAP) service is used in the preferred embodiments. The LDAP directory includes built-in functions for authenticating a user that requests access to an entry. Each resource that needs to be protected is mapped to an entry in the LDAP directory. These entries that correspond to protected resources external to the LDAP directory are called proxy entries. Proxy entries contain the authorization information for the corresponding protected resource in the form of an access control list for each entry that specifies the authorized users of the entry. When a user needs to access a protected resource, the user or an application uses the LDAP directory to determine whether the user is authenticated and authorized to access the proxy entry in the directory that corresponds to the resource. If the user is authenticated and authorized to access the proxy entry, the user may then access the corresponding external protected resource. The present invention thus allows the use of the internal LDAP authentication and authorization functions to determine which users are allowed to access protected resources that are external to the LDAP directory.

3 Claims, 6 Drawing Sheets

APPARATUS AND METHOD FOR USING A DIRECTORY SERVICE FOR AUTHENTICATION AND AUTHORIZATION TO ACCESS RESOURCES OUTSIDE OF THE DIRECTORY SERVICE

BACKGROUND OF THE INVENTION

1. Technical Field

This invention generally relates to computer systems and more specifically relates to an apparatus and method for authorizing and authenticating access to resources in a computer system.

2. Background Art

Since the dawn of the computer age, computer systems have evolved into extremely sophisticated devices, and computer systems may be found in many different settings. Modern computers are a sophisticated blend of hardware (e.g., integrated circuits and circuit boards) and software (e.g., computer programs). The power of a computer system is measured by the amount of work it can perform. With recent advances in both hardware and software, computer systems have become extremely powerful. A desktop computer today can out-perform by orders of magnitude computers of the same size just a few years earlier.

One common concern in computer programming is the need to provide authentication and authorization mechanisms. Authentication assures that an entity that requests access is known to the system. Authorization assures that the entity is authorized to access the requested resource. Thus, authentication and authorization can be though of as two different levels of security measures. If a user wants to access a computer system, the user typically must "log in" by entering a user name and password. Assuming the user enters a correct user name and password combination, the user is authenticated to the computer system, and is provided access to the computer's functions. Once logged in, the user may request access to a particular resource on the computer system, such as a file or a database table. The system can then determine from stored security information whether the user should be granted access to the requested resource or not. In this manner, authentication acts as a gate to keep unauthorized users out of the computer system, while authorization acts as a filter to assure that users access only the resources they are authorized to access.

Figure 1:
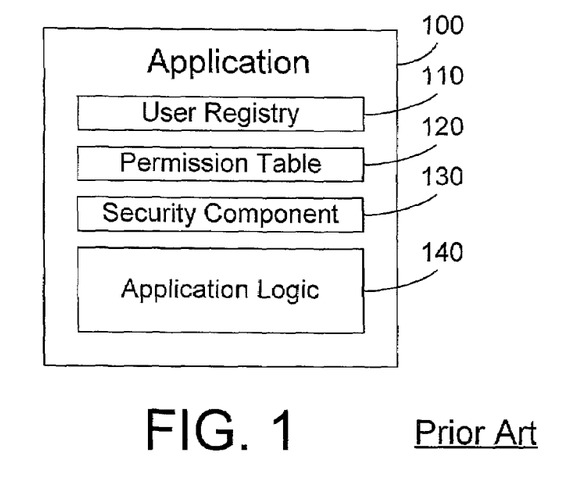
FIG. 1 is a block diagram of a prior art application that implements security to control access to resources.

The most common way to provide authentication and authorization in a computer program is for the programmer to provide code that performs the authentication and authorization functions. Referring to FIG. 1, a prior art application 100 is one type of computer program, and we assume that application 100 requires authentication and authorization functions to protect one or more resources that may be accessed by application 100. A programmer will typically define a user registry 110 in the application that contains a list of the users that can access the application. A permission table 120 is then provided that defines for each user the permitted access to resources that may be accessed by the application 100. A security component 130 provides authentication by assuring a user is listed in the user registry 110, and provides authorization by assuring a user has permission to access a requested resource according to permission table 120. Application logic 140 simply denotes the "rest" of the application that is not concerned with authentication and authorization.

Programming security into each application to provide the needed authentication and authorization functions is very time-consuming. In addition, there are no standards that allow security information for one application to be shared with a different application, so each application typically has its own user registry and its own scheme for performing authentication and authorization functions. As a result, a user has to register with each application separately. Without an apparatus and method for standardizing authentication and authorization in software applications, programmers will be forced to continue to provide authentication and authorization functions in each application, providing a great duplication of effort, thereby resulting in unnecessary effort and cost to the industry.

DISCLOSURE OF INVENTION

According to the preferred embodiments, an apparatus and method use the built-in authentication and authorization functions of a directory service to perform authentication and authorization for resources that are external to the directory service. A Lightweight Directory Access Protocol (LDAP) service is used in the preferred embodiments. The LDAP directory includes built-in functions for authenticating a user that requests access to an entry. Each resource that needs to be protected is mapped to an entry in the LDAP directory. These entries that correspond to protected resources external to the LDAP directory are called proxy entries. Proxy entries contain the authorization information for the corresponding protected resource in the form of an access control list for each entry that specifies the authorized users of the entry. When a user needs to access a protected resource, the user or an application uses the LDAP directory to determine whether the user is authenticated and authorized to access the proxy entry in the directory that corresponds to the resource. If the user is authenticated and authorized to access the proxy entry, the user may then access the corresponding external protected resource. The present invention thus allows the use of the internal LDAP authentication and authorization functions to determine which users are allowed to access protected resources that are external to the LDAP directory.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

The method and apparatus of the present invention uses an LDAP directory to provide authentication and authorization of resources that are external to the LDAP directory. For those individuals who are not familiar with LDAP directories, a brief overview of relevant concepts is presented here.

LDAP is the Lightweight Directory Access Protocol which is a known protocol for accessing a directory service in a computer network such as the Internet. The predecessor for LDAP is Directory Access Protocol (DAP), which is part of X.500, a standard for directory services in a network. DAP is very powerful, but has substantial overhead as well. Researchers at the University of Michigan developed LDAP in an attempt to "lighten up" DAP to provide many of its benefits without all of the associated overhead. Their attempts have met with resounding success as measured by the widespread acceptance by many companies of LDAP as a standard for networked directory services.

LDAP is a directory service that runs over Transmission Control Protocol/Internet Protocol (TCP/IP). The LDAP directory service follows a client/server model. One or more LDAP servers contain the directory data. An LDAP client connects to an LDAP server and makes a request. The server responds with a reply, or with a pointer (or referral) to another LDAP server. Because LDAP is a directory service, rather than a database, the information in an LDAP directory is usually descriptive, attribute-based information. LDAP users generally read the information in the directory much more often than they change it. Updates are typically simple, all-or-nothing changes. Common uses of LDAP directories include online telephone directories and e-mail directories.

The LDAP information model is based on an "entry", which contains information about some object. Entries are typically organized into a specified tree structure, the organization of which is defined by a schema. LDAP defines a number of directory service operations with respect to the tree and data contained therein including authentication, search and retrieval, entry addition/deletion, and entry modification.

In an LDAP directory, an entry is a collection of attributes that has a name, called a distinguished name (DN). The DN is used to refer to the entry unambiguously. Each of the entry's attributes has a type and one or more values. The types are typically mnemonic strings, line "cn" for common name or "mail" for an e-mail address. The values depend on what type of attribute it is. For example, a mail attribute might contain a text e-mail address, while a jpegPhoto attribute would contain a photograph in binary JPEG/JFIF format.

LDAP allows control over which attributes are required and allowed in an entry through the use of a special attribute called objectclass. The values of the objectclass attribute determine the schema rules the entry must obey. An entry is referenced by its distinguished name, which is constructed by taking the name of the entry itself (called the relative distinguished name, or RDN) and concatenating the names of its ancestor entities. Details of LDAP are available in W.

Yeong, T. Howes, and S. Kille, "Lightweight Directory Access Protocol", Network Working Group, Request for Comments: 1777, March 1995.

Figure 2:
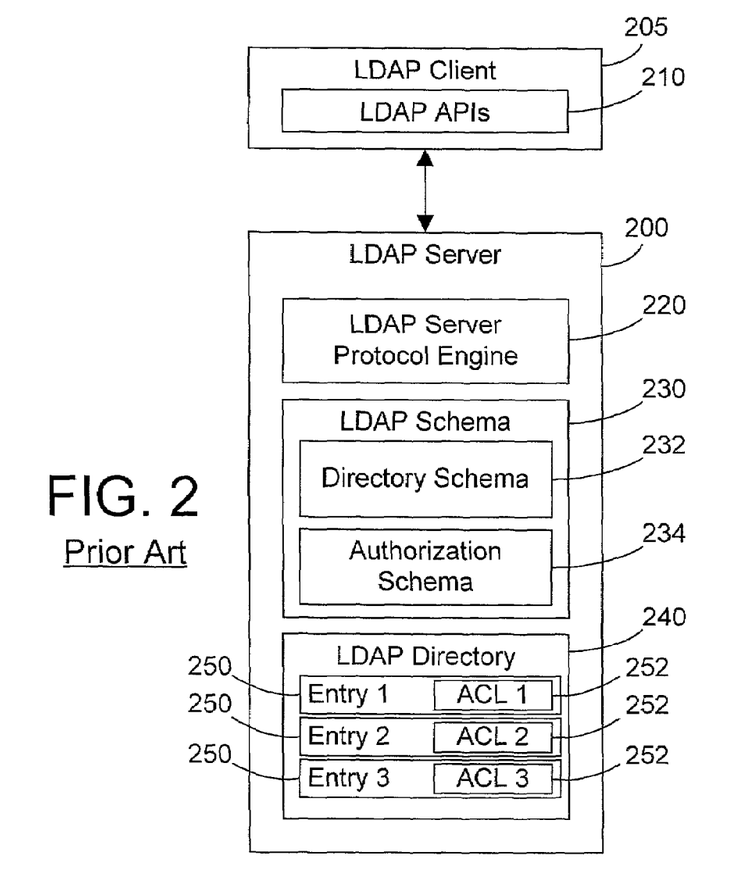
FIG. 2 is a block diagram of a prior art LDAP server.

An example of a known LDAP server 200 coupled to an LDAP client 205 is shown in FIG. 2. LDAP client 205 includes LDAP APIs 210, which provide the interface for communicating with the LDAP server 200. LDAP APIs 210 include functions that allow creating, deleting, and modifying entries in the LDAP directory. In addition, LDAP APIs 210 include the capability of searching the entries. The "Bind" operation in LDAP APIs 210 include an authentication function. The bind operation initiates a protocol session between a client 205 and a server 200, and allows authentication of the client to the server.

LDAP server 200 includes LDAP server protocol engine 220, which enforces the specified protocol for communicating with LDAP server 200. LDAP schema 230 includes directory schema 232 and authorization schema 234. Directory schema 232 defines the layout and contents of each entry in the LDAP directory and how each entry is related to each other entry. Authorization schema 234 specifies that an access control list (ACL) for each entry is used to perform authorization functions for the entry. For example, an access control list for an entry may indicate that a supervisor can read or write an entry, while a regular user can only read the entry. This is useful, for example, in reading and maintaining an e-mail list. Any attempt by a regular user to write an entry would return an error. While access control lists are not part of the LDAP specification, the use of access control lists with directory services such as LDAP is very well known and often practiced in the art.

LDAP directory 240 contains a plurality of entries 250. These entries can have different forms depending on their relationship to the other entries as defined in the LDAP schema 230. For example, one entry may represent a company, while another entry may represent an employee of the company. Entries 250 are typically in cleartext form and may therefore be easily read by the user or application that accesses them. Each entry 250 may include a corresponding access control list (ACL) 252. Each access control list 252 specifies the users that are authorized to access the particular entry 250. Thus, when an entry 250 is created in the LDAP directory 240, an access control list 252 is generally created that specifies who are the authorized users of the entry. Note that creating an access control list for each entry is not a mandatory step. If no access control list is created, this means that any user that requests access to the entry will be able to access the entry. If the creator of the entry wants to limit access to the entry to specified users, it must create an access control list that lists the authorized users of the entry. Note that the term "user" in this context is not limited to human users, but could include applications, other programs, objects, or any other entity capable of accessing an entry in the LDAP directory.

Figure 3:
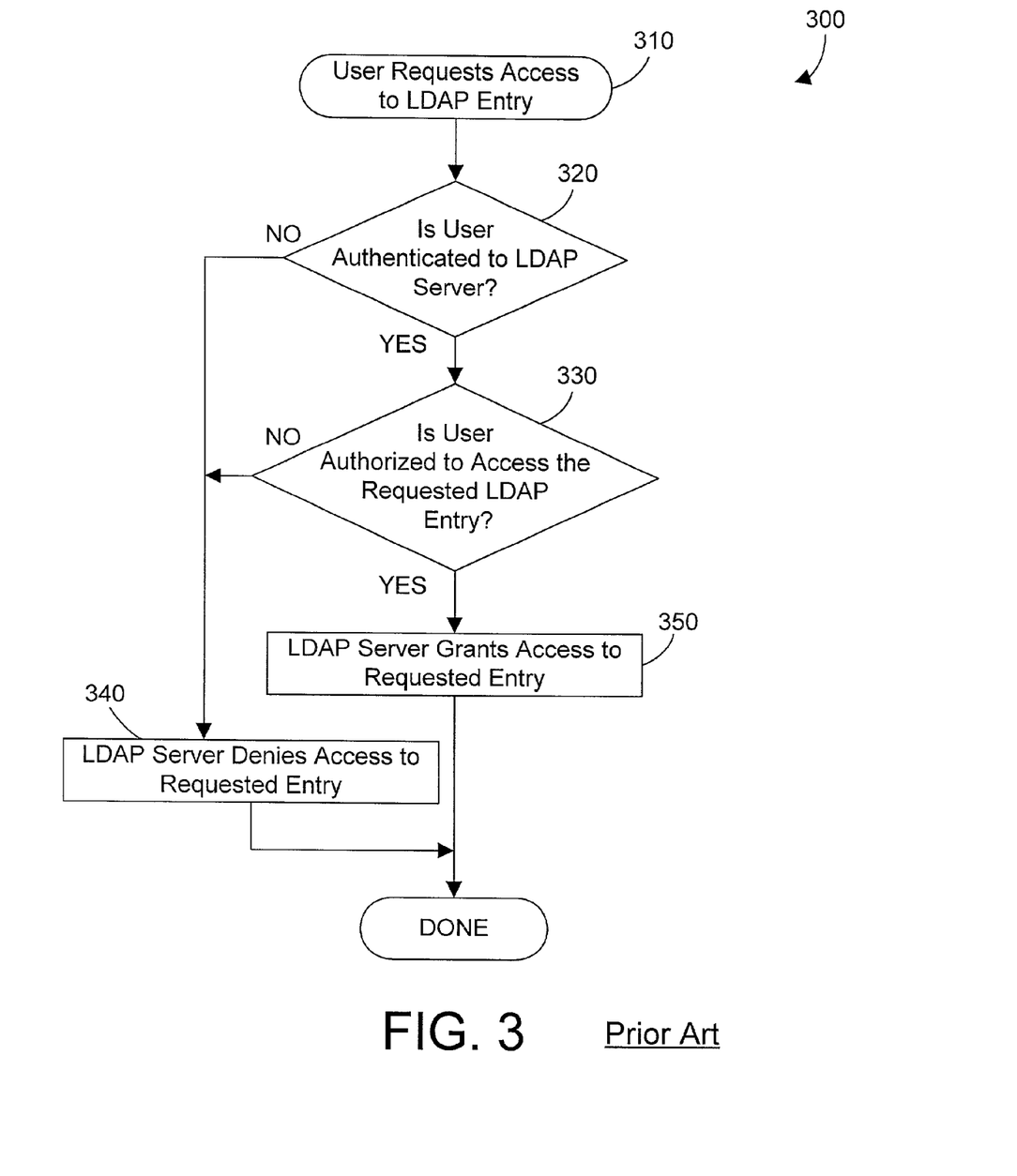
FIG. 3 is a flow diagram of a prior art method for an LDAP server to provide authentication and authorization functions before granting access to an entry in the LDAP directory.

Referring to FIG. 3, a method 300 for the LDAP server 200 of FIG. 2 begins when a user requests access to an LDAP entry (step 310). Note that "user" in this context may be a human user that directly invokes LDAP APIs 210, may be an application that invokes LDAP APIs 210 on behalf of a human user, or may be any other computer program or other mechanism that may invoked LDAP APIs 210. The LDAP server 200 first determines whether the user is authenticated to the LDAP server (step 320). This is done during the bind operation that initiates a protocol between an LDAP client and an LDAP server. If the user is authenticated to the LDAP server (step 320=YES), the LDAP server then determines whether the user is authorized to access the requested LDAP entry (step 330). The authorization check is performed by the LDAP server reading the access control list 252 corresponding to the requested LDAP entry to see if the requesting user is in the access control list 252. If the requesting user is in the access control list 252 for the proxy entry corresponding to the protected resource, the requesting user is authorized to access the proxy entry, and the LDAP server returns the value of the proxy entry to the requesting user. If the user is not authenticated to the LDAP server (step 320=NO), or if the user is not authorized to access the requested LDAP entry (step 330=NO), the LDAP server denies the user's request to access the requested entry (step 340). If the user is authenticated to the LDAP server (step 320=YES) and is authorized to access the requested LDAP entry (step 330=YES), the LDAP server grants to the user the access to the requested entry (step 350). Method 300 thus checks to make sure that a user is authenticated to the LDAP server and authorized to the requested entry before granting access to the requested entry.

Note that some operations on an LDAP directory may not require checking for authorization in step 330. For example, if a user merely wants to read an entry in the LDAP directory, a read operation may generally be allowed without performing an authorization step (like step 330 of FIG. 3). In addition, if no access control list has been created for an entry, no authorization step for accessing the entry is required. Now that the prior art has been described, the framework has been laid for discussing the preferred embodiments and describing the distinguishing features when compared to the prior art.

DETAILED DESCRIPTION

Figure 4:
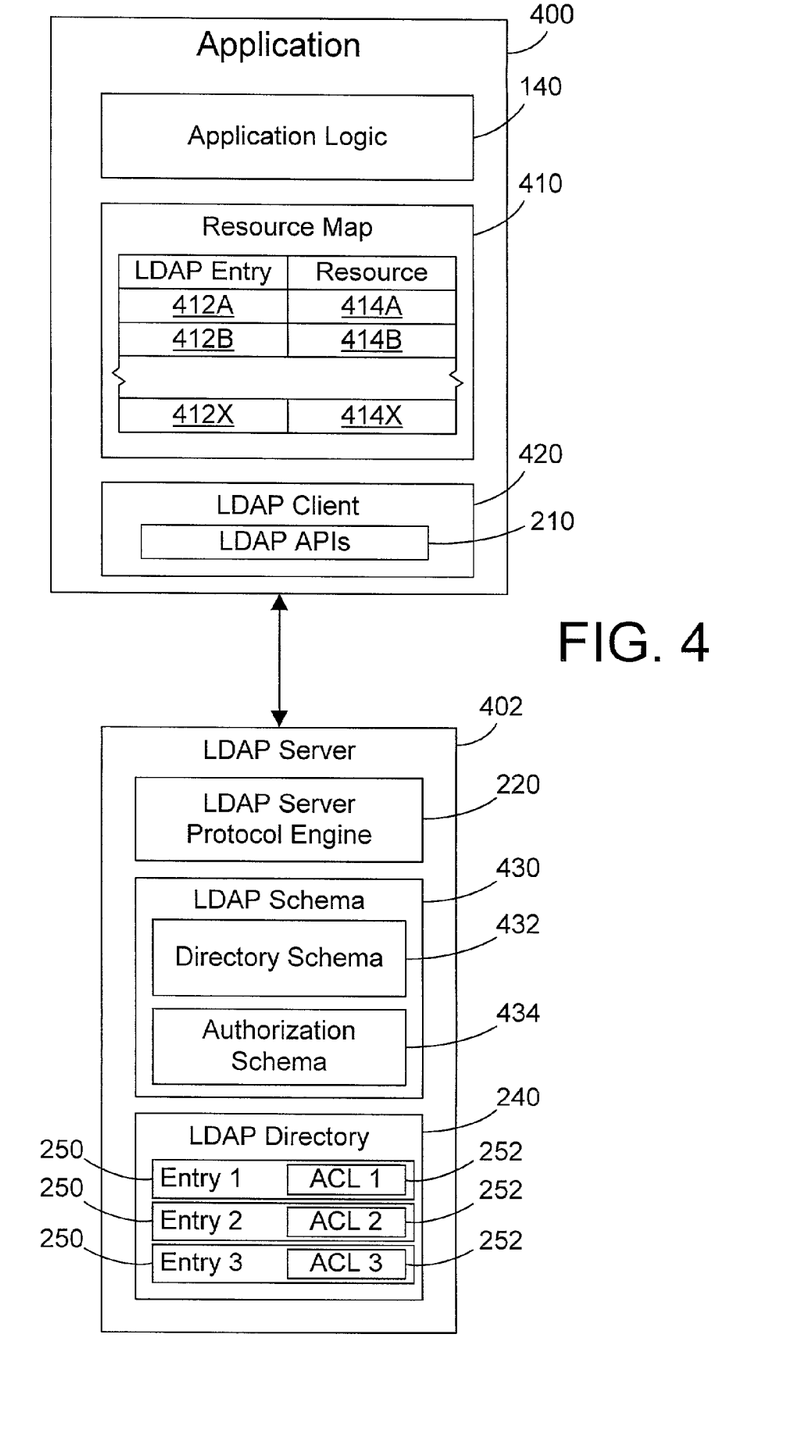
FIG. 4 is a block diagram of an application 400 in accordance with the preferred embodiments that uses an LDAP server 402 to perform authentication and authorization when a user requires access to a protected resource.

Referring to FIG. 4, a software application 400 includes application logic 140, the same as in application 100 in FIG. 1. The application logic of an application in the prior art may be the same as the application logic in the preferred embodiments. The difference between application 100 in FIG. 1 and application 400 in FIG. 4 is the way that authentication and authorization are performed. In FIG. 1, application 100 has to keep track of all authentication and authorization information, and must perform these checks whenever necessary. In FIG. 4, application 400 does not have to keep track of all users and their permission levels. Instead, application 400 maintains a resource map 410 that correlates an entry in the LDAP directory to a corresponding protected resource. Each entry in the resource map 410 includes an LDAP entry 412 and corresponding protected resource 414, as shown by the pairs 412A, 414A; 412B, 414B; and 412X, 414X in the resource map 410 of FIG. 4.

The resource map 410 shown in FIG. 4 may be information within a defined data structure, such as a database table, or could simply be implemented within the application logic 140 itself. Thus, if an application wants to protect access to a record in a database, it could create an LDAP entry that has the same name as the name of the database record. In this case, the mapping between LDAP entry and protected resource would be implicit within the application logic 140, and no separate resource map 410 would be required.

Note that the application 400 has complete control over determining which resources are protected and which are not. This provides great power in defining what exactly needs to be protected in the application. The preferred embodiments extend to any user using the LDAP directory for authentication and authorization to access a protected resource, whether the user is a human user, an application, or some other mechanism for invoking LDAP APIs 210. A protected resource could be a physical apparatus, such as a computer system, printer, or disk drive. A protected resource could be a computer program. A protected resource could be a database table, or a particular record within a database table. A protected resource could be an object in an object oriented program. A protected resource could be an object method on an object oriented object. A protected resource could be a text file. A protected resource could be a sentence within a text file. A protected resource could be a particular line or word in a text file. These many examples are provided to illustrate that a protected resource can be almost anything that the application may need to define as protected. The term "protected resource" as used herein expressly extends to anything that may need to be protected from access by a user or a computer program, whether currently contemplated or developed in the future. Because the application builds the mapping between protected resources and LDAP entries (such as resource map 410), the application can dynamically define protected resources as required. Once a protected resource 414 is identified, an LDAP entry 412 is then created that corresponds to the protected resource 414. Note that an LDAP entry 412 that corresponds to a protected resource 414 is referred to herein as a "proxy entry." The term "proxy entry" is not a term that is known in the art, but is coined herein to denote an entry in the LDAP directory that represents something that is outside of the LDAP directory. Because these types of entries represent something else, they are referred to herein as "proxy entries."

For the purpose of illustrating the concepts of the preferred embodiments, we assume that application 400 may be used may multiple human users, and that authentication and authorization for these users is needed. Application 400 includes an LDAP client 420. LDAP client 420 requests authentication and authorization functions from the LDAP server 402 as required by the application 400 by invoking LDAP APIs 210. LDAP client 420 is thus coupled to the LDAP server 200 via some networking mechanism that supports TCP/IP. When LDAP client 420 needs to check the authorization for application 400 to access a protected resource, LDAP client 420 invokes one or more of the LDAP APIs 210, passing a reference to the proxy entry corresponding to the protected resource as a parameter to the call. In response, the LDAP APIs 210 generate an appropriate message to the LDAP server protocol engine 220, which checks to see if the application is authorized to access the specified proxy entry by consulting the access control list 252 corresponding to the specified proxy entry 250. If the application is listed as an authorized user of the specified proxy entry, as indicated by the LDAP server 402 returning the value of the specified proxy entry to LDAP client 420 in response to the request of the LDAP client 420, application 400 then knows that it can access the protected resource that corresponds to the specified proxy entry.

By using a directory service such as LDAP, an application may push all of the responsibility for authentication and authorization to the LDAP server instead of generating and maintaining this information. One significant advantage of this approach is that a list of users could be defined in the LDAP directory, and multiple applications 400 could use the same list of users and could use similar authentication and authorization schemes that operate on the LDAP directory. Because an LDAP server is a standardized piece of code that must meet standard specifications regardless of implementation, an application can off-load the authentication and authorization logic to the LDAP server 402 through the use of proxy entries.

The concepts upon which the preferred embodiments are built are very simple, yet powerful. A user or application can decide what resource needs to be protected, and can then generate an LDAP proxy entry for each protected resource. When the user or application needs to access the protected resource, it requests that the LDAP client access the corresponding proxy entry in the LDAP directory. If access is granted to the requested proxy entry, the user or application knows that it can access the protected resource. If access is denied, the user or application knows that it cannot access the protected resource.

Figure 5:
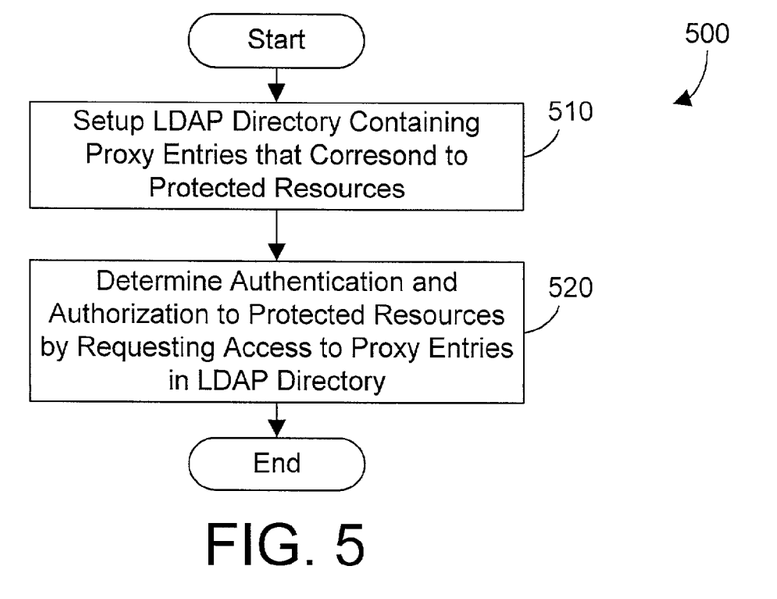
FIG. 5 is a flow diagram of a method in accordance with the preferred embodiments for using an LDAP directory to provide authentication and authorization functions for resources that are not in the LDAP directory.

Referring now to FIG. 5, a method 500 in accordance with the preferred embodiments begins by setting up an LDAP directory containing proxy entries that correspond to protected resources (step 510). Once the proxy entries have been defined, the authentication and authorization of a user or application to access protected resources can be determined by requesting access to proxy entries in the LDAP directory (step 520).

Figure 6:
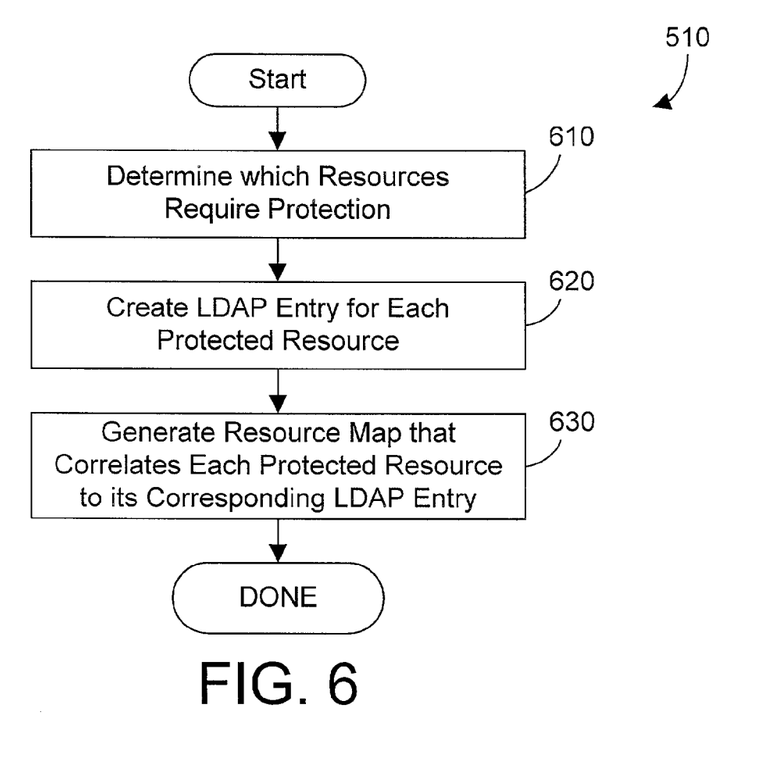
FIG. 6 is a flow diagram of one sample implementation of step 510 in FIG. 5.

One specific implementation of step 510 in FIG. 5 is shown in FIG. 6. First, a user or application must determine which resources require protection (step 610). Next, an LDAP entry is created for each protected resource (step 620). These LDAP entries created in step 620 are the proxy entries referred to herein. A resource map is then generated that correlates each protected resource to its corresponding LDAP entry (step 630). Note that steps 610, 620 and 630 can be performed off-line, before an application is run, or could be performed repeatedly as an application runs and as new resources that need to be protected are identified.

Figure 7:
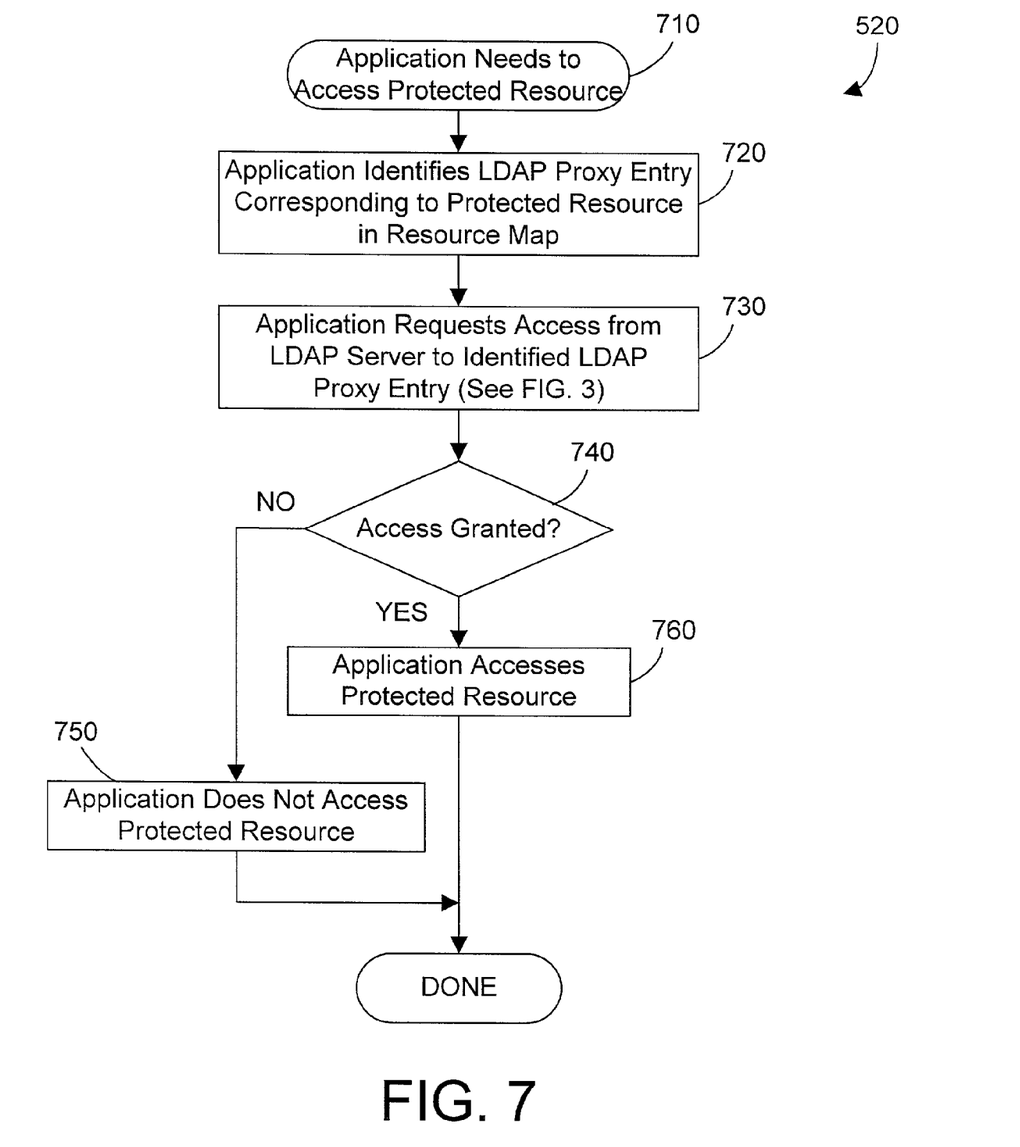
FIG. 7 is a flow diagram of one sample implementation of step 520 in FIG. 5.

One specific implementation of step 520 in FIG. 5 is shown in FIG. 7. We assume that step 520 begins when an application needs to access a protected resource (step 710). The application identifies the LDAP proxy entry that corresponds to the protected resource that the application wants to access (step 720). In the specific implementation of FIG. 4, application 400 would locate the protected resource 424 in the resource map 410, and would then read the corresponding LDAP entry 412 from the resource map 410. Once the application has identified the proxy entry that corresponds to the protected resource, the application requests to the LDAP server to access the proxy entry (step 730). If the LDAP server denies access to the specified proxy entry (step 740=NO), the application does not access the protected resource (step 750). If, however, the LDAP server grants access to the specified proxy entry (step 740=YES), the application can then access the protected resource (step 760). The methods of the preferred embodiments thus push the task of determining authentication and authorization for a proxy entry onto the LDAP server, which already has built-in logic to handle this task. If the LDAP server allows the application to access a proxy entry, the application knows it is authorized to access the corresponding protected resource. If, however, the LDAP server denies access to a proxy entry by the application, the application knows it is not authorized to access the corresponding protected resource.

Figure 8:
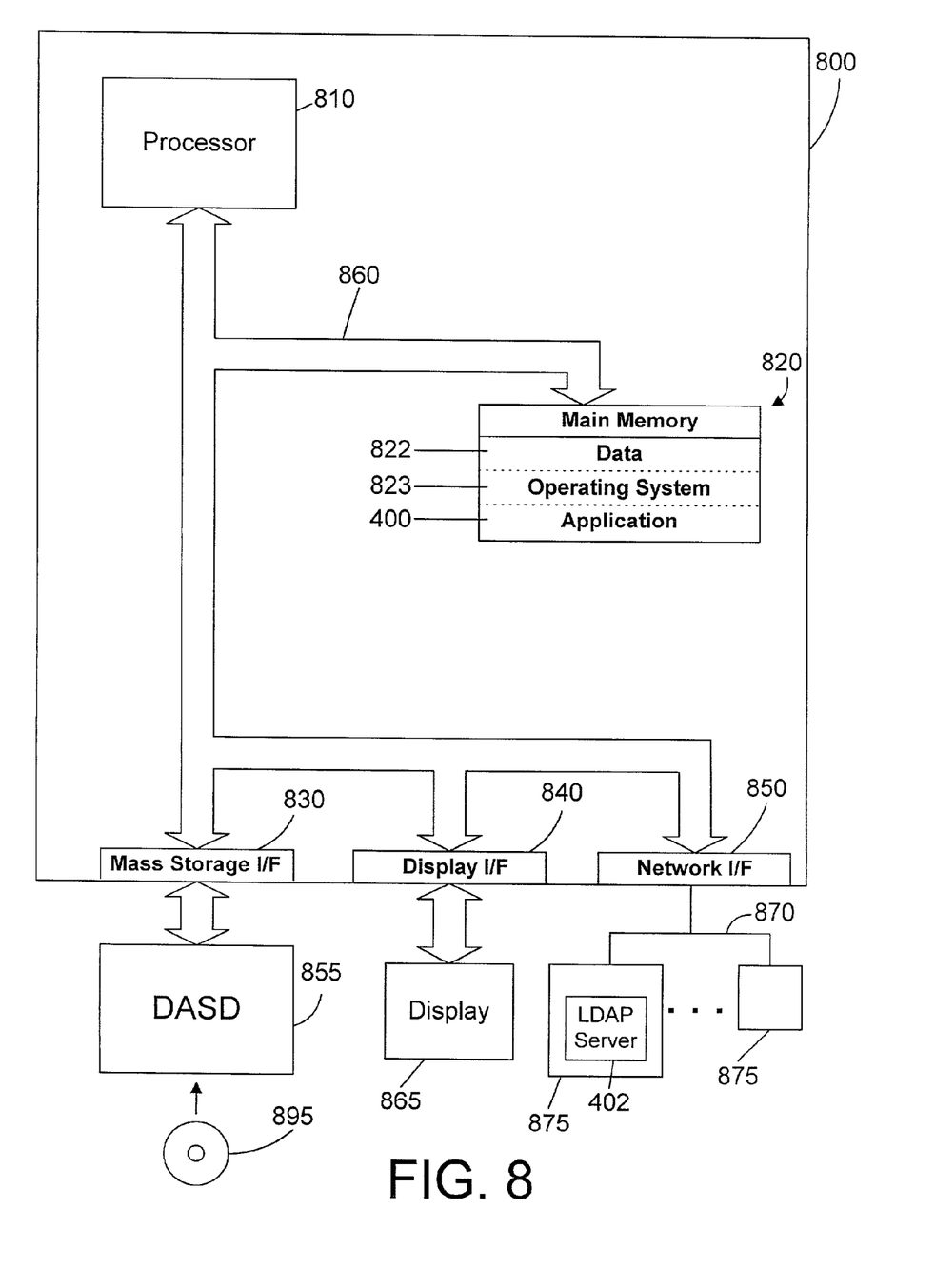
FIG. 8 is an apparatus in accordance with the preferred embodiments.

Referring to FIG. 8, one specific implementation of an apparatus in accordance with the preferred embodiments is an IBM iSeries 400 computer system 800. Computer system 800 comprises a processor 810 connected to a main memory 820, a mass storage interface 830, a display interface 840, and a network interface 850. These system components are interconnected through the use of a system bus 860. Mass storage interface 830 is used to connect mass storage devices (such as a direct access storage device 855) to computer system 800. One specific type of direct access storage device is a read/write CDROM drive, which may store data to and read data from a CDROM 895.

Main memory 820 in accordance with the preferred embodiments contains data 822, an operating system 823, and application 400. Computer system 800 utilizes well known virtual addressing mechanisms that allow the programs of computer system 800 to behave as if they only have access to a large, single storage entity instead of access to multiple, smaller storage entities such as main memory 820 and DASD device 855. Therefore, while data 822, operating system 823, and application 400 are shown to reside in main memory 820, those skilled in the art will recognize that these items are not necessarily all completely contained in main memory 820 at the same time. It should also be noted that the term "memory" is used herein to generically refer to the entire virtual memory of computer system 800.

Data 822 represents any data that serves as input to or output from any program in computer system 800. Operating system 823 is a multitasking operating system known in the industry as OS/400; however, those skilled in the art will appreciate that the spirit and scope of the present invention is not limited to any one operating system. Application 400 preferably has the configuration shown in FIG. 4, which includes application logic 140, a resource map 410, and an LDAP client 420.

Processor 810 may be constructed from one or more microprocessors and/or integrated circuits. Processor 810 executes program instructions stored in main memory 820. Main memory 820 stores programs and data that processor 810 may access. When computer system 800 starts up, processor 810 initially executes the program instructions that make up operating system 823. Operating system 823 is a sophisticated program that manages the resources of computer system 800. Some of these resources are processor 810, main memory 820, mass storage interface 830, display interface 840, network interface 850, and system bus 860.

Although computer system 800 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 810. However, those skilled in the art will appreciate that the present invention applies equally to computer systems that simply use I/O adapters to perform similar functions.

Display interface 840 is used to directly connect one or more displays 865 to computer system 800. Display 865 may be simple display devices or fully programmable workstations, and are used to allow system administrators to communicate with computer system 800.

Network interface 850 allows computer system 800 to send and receive data to and from any network 870 to which the computer system may be connected, to communicate with one or more computer systems 875 that are coupled to the network 870. Network 870 may be a local area network (LAN), a wide area network (WAN), or more specifically the Internet. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

We assume that one of the workstations 875 includes an LDAP server 402, with the features shown in more detail in FIG. 4. In this manner application 400 running on computer system 800 may use LDAP server 402 to perform authentication and authorization of protected resources that may need to be accessed by application 400.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as CDROM (e.g., 895 of FIG. 8) and floppy disks, and transmission type media such as digital and analog communications links.

The apparatus, methods and program products described herein allow an application to use existing authentication and authorization functions in a directory service in a new way that effectively provides authentication and authorization to access protected resources that are not stored within the directory service. In this manner the security details may be pushed into the directory service, freeing up the application from the requirement of providing these functions. At the same time, the application has complete control over the granularity of protection by simply assigning an LDAP proxy entry to each resource that needs to be protected, no matter how large or small. Because many networked computing systems have an LDAP directory present already containing directory entries for applications and users, implementing the authentication and authorization functions for an application using the existing LDAP functions greatly streamlines the programming of applications, which increases the cost-efficiency of generating a software application.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   a directory service server that accesses a directory that has a plurality of entries, the plurality of entries including at least one proxy entry that contains security information for a corresponding protected resource, the directory service server including authentication and authorization functions that determine whether a selected one of the plurality of entries may be accessed;
   a plurality of protected resources that are not stored or contained within the directory;
   an application residing in the memory and executed by the at least one processor, the application including a logical mapping that correlates each protected resource with a corresponding proxy entry, the application determining whether the application is authorized to access a selected protected resource by invoking the authentication and authorization functions in the directory service server to determine whether the proxy entry corresponding to the selected resource may be accessed, and if so, the application accesses the selected protected resource.

2. The apparatus of claim 1 wherein the directory service server is a Lightweight Directory Access Protocol (LDAP) server, and wherein the directory is an LDAP directory.

3. The apparatus of claim 1 wherein the application does not access the selected protected resource if the proxy entry corresponding to the selected resource cannot be accessed.

* * * * *